US011263685B1

(12) United States Patent
Bell et al.

(10) Patent No.: US 11,263,685 B1
(45) Date of Patent: Mar. 1, 2022

(54) PROVIDING COMPLEMENTARY ITEMS TO REQUESTED ITEMS

(71) Applicant: Amazon Technologies, Inc., Seattle, WA (US)

(72) Inventors: Adrian Ross Bell, Seattle, WA (US); Andre Wyatt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 16/576,978

(22) Filed: Sep. 20, 2019

(51) Int. Cl.
*G06Q 30/06* (2012.01)

(52) U.S. Cl.
CPC ..... *G06Q 30/0631* (2013.01); *G06Q 30/0603* (2013.01); *G06Q 30/0641* (2013.01)

(58) Field of Classification Search
CPC .... G06Q 30/00; G06Q 30/06; G06Q 30/0601; G06Q 30/0603; G06Q 30/0631; G06Q 30/0641; G06Q 30/08
USPC .............................................. 705/26.1–27.2
See application file for complete search history.

(56) References Cited

U.S. PATENT DOCUMENTS

| | | | | |
|---|---|---|---|---|
| 7,386,485 | B1* | 6/2008 | Mussman | G06Q 30/02 705/14.1 |
| 9,471,197 | B2* | 10/2016 | Joo | G06F 3/0482 |
| 9,965,526 | B1* | 5/2018 | Chanda | G06Q 30/0269 |
| 10,055,784 | B1* | 8/2018 | Boelter | G06Q 30/0641 |
| 10,275,818 | B2* | 4/2019 | Levy | G06Q 30/02 |
| 10,332,181 | B1* | 6/2019 | McAllister | G06Q 30/0629 |
| 2008/0155473 | A1* | 6/2008 | Duhig | G06F 3/0485 715/818 |
| 2013/0041778 | A1* | 2/2013 | Nativ | G06Q 30/08 705/26.62 |
| 2014/0365318 | A1* | 12/2014 | Karande | G06Q 30/0275 705/14.71 |
| 2016/0071187 | A1* | 3/2016 | Bhosle | G06Q 30/0641 705/26.7 |

(Continued)

FOREIGN PATENT DOCUMENTS

| | | | | |
|---|---|---|---|---|
| EP | 2704089 | A2 * | 3/2014 | G06Q 30/0278 |
| EP | 3079116 | A1 * | 10/2016 | G06N 20/00 |

(Continued)

OTHER PUBLICATIONS

Wu, Jui-Chieh, et al. "Session-Based Complementary Fashion Recommendations." Zalando Research, Sep. 2019, research.zalando.com/fashionxrecsys/workshop-files/fashionxrecsys2019_paper_7.pdf.*

(Continued)

*Primary Examiner* — Michael Misiaszek
(74) *Attorney, Agent, or Firm* — Thomas | Horstemeyer LLP

(57) ABSTRACT

Disclosed are various embodiments for identifying complementary items to items available for sale, lease, download, rent, etc. by different merchants in an electronic commerce system and presenting the complementary items alongside requested items in a user interface to improve a user experience when interacting with the electronic commerce system. The user interface includes a first user interface object that includes the requested items and a second user interface object that includes the complementary items to the requested items. The complementary items are displayed in the second user interface object in vertical alignment with a position of the corresponding requested item in the first user interface object.

20 Claims, 7 Drawing Sheets

(56) References Cited

U.S. PATENT DOCUMENTS

2018/0046681 A1* 2/2018 Bastide ................. G06F 3/0482
2020/0202408 A1* 6/2020 Raviv ................. G06Q 30/0255

FOREIGN PATENT DOCUMENTS

JP         2014182636 A * 9/2014
WO    WO-2016109368 A1 * 7/2016 ........... G06Q 20/202

OTHER PUBLICATIONS

A generalized taxonomy of explanations styles for traditional and social recommender systems. Alexis Papadimitriou, Panagiotis Symeonidis, Yannis Manolopoulos. Data Min Knowl Disc 24, 555-583 (2012). https://doi.org/10.1007/s10618-011-0215-0. Retrieved via ProQuest. (Year: 2012).*

Like This? You'll Hate That. (Not All Web Recommendations Are Welcome.) New York Times (Online), New York: New York Times Company. Jan. 23, 2006. Retrieved via ProQuest. (Year: 2006).*

Product recommendation platform for e-com sites Unbxd eyes expansion to US, Singapore &Hong Kong, claims to be adding 4 . . . Publication info: Techcircle.in ; New Delhi (Dec. 17, 2013). Retrieved via ProQuest. (Year: 2013).*

* cited by examiner

PROVIDING COMPLEMENTARY ITEMS TO REQUESTED ITEMS

BACKGROUND

An electronic commerce system may include listings of items offered for sale, lease, download, rent, etc., by many different merchants. Users may use the electronic commerce system to purchase, lease, download, rent, etc., items of interest. In some instances, users may wish to repeat behavior with respect to particular items of interest.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
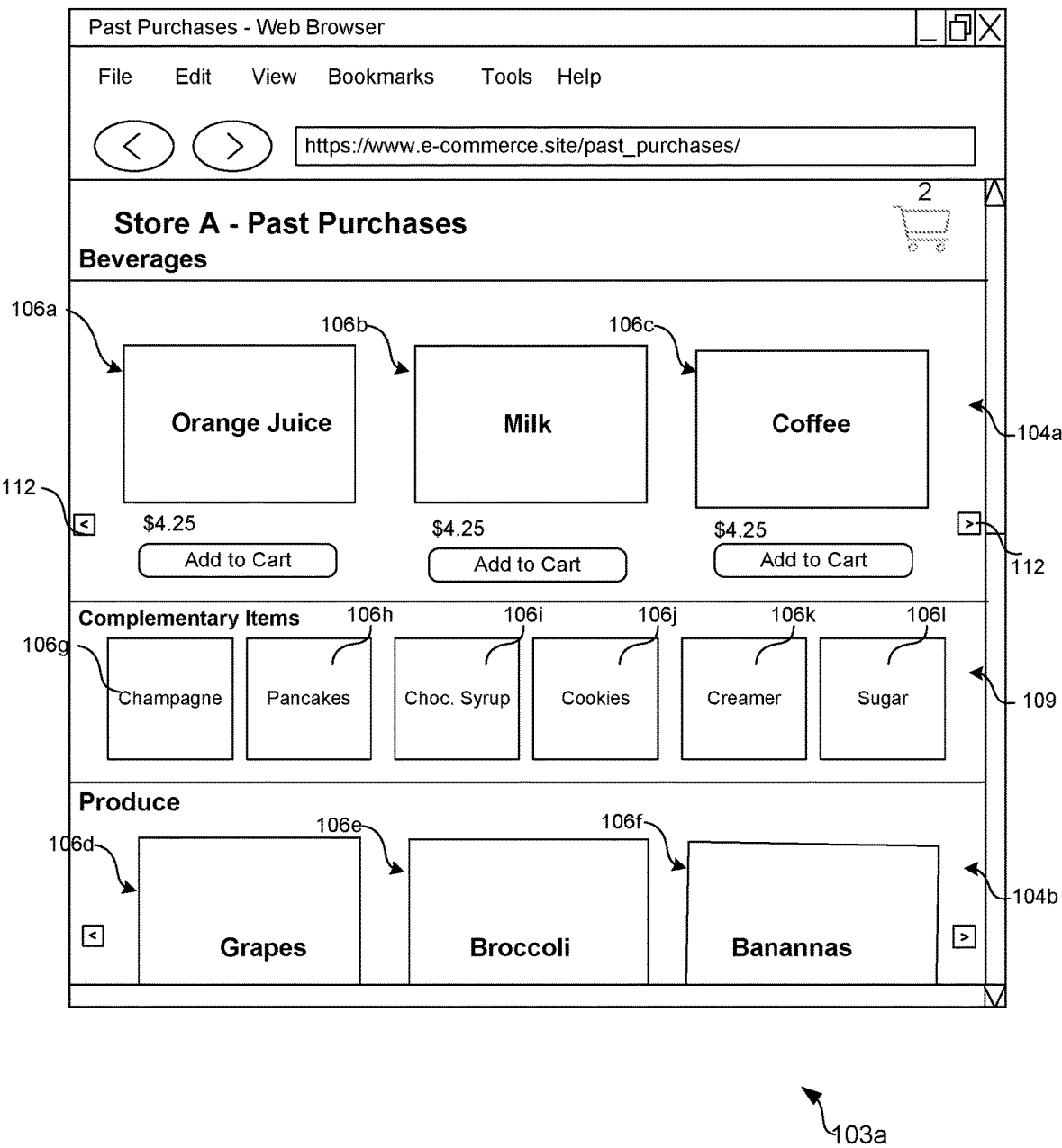
FIG. 1 is a drawing of an example user interface illustrating previously purchased items and corresponding complementary items according to various embodiments of the present disclosure.

The present disclosure relates to identifying complementary items to items available for sale, lease, download, rent, etc. by different merchants in an electronic commerce system. In addition, the present disclosure relates to presenting complementary items alongside requested items (e.g., previously purchased, recommended, wish list) in a user interface to improve a user experience when interacting with the electronic commerce system. Typically, in a grocery store setting, for example, items may be presented to a user according to a particular item category (e.g., produce, beverage, household goods, etc.). By presenting complementary items alongside requested items, a user may be presented an item that may be of interest without the user having to navigate to a different area of an item catalog to find the complementary item.

A complementary item is an item that is linked to a particular item according to product attributes, known recipes, and/or other factors. A complementary item can differ from a traditional recommended item as complementary items may not be linked based on prior individual and/or aggregate purchases. For example, orange juice may be associated with attributes related to breakfast, marinades, Vitamin C, skin enhancer, and/or other attributes. Similarly, champagne may be associated with attributes related to celebration, breakfast, alcohol, skin enhancer, and/or other attributes. Further, it is known that the recipe for a mimosa includes a combination of orange juice and champagne. As such, because both items may be linked to one another through attributes (e.g., breakfast, skin enhancer) and/or known recipes (e.g., mimosa recipe), champagne and orange juice may be associated to one another as complements.

In another example, milk and cookies may be determined to be complements of one another, as both may share attributes associated with snack foods and/or other attributes. In the example of milk and cookies, if the user is presented an item listing for milk under a category for "Beverages," the user may also be interested in cookies which may be typically presented under a category for "Snacks" or "Desserts." In this case, the user may be presented both items at the same time, which in turn eliminates the need for the user to view item listings in a different category to be able to select an item of interest (e.g., cookies).

According to various embodiments, a catalog of complementary items may be built according to a comparison of attributes of items in an item catalog associated with the electronic commerce system, an analysis of a recipe database, and/or a review of other information that may be used to identify or otherwise link products as being complementary to one another. In some examples, a manual verification process may be used to verify a built catalog of complementary items in order to verify accuracy.

To improve a user experience for a user interacting with an electronic commerce system, when a user requests to view a list of items (e.g., previously purchased items, saved items, recommended items, etc.), complementary items to each of the items in the requested list of items can be presented in association with a display of the list of items. For example, complementary items for a particular item may be presented in a user interface object (e.g., panel, card, etc.), that is situated below and in alignment with a display of the item listing of the particular item. According to various embodiments, identified complementary items may be assigned scores according to a user context or other type of user data, such that the presented items are selected according to a known user interest. For example, if a user is known to consume a gluten-free diet, items containing gluten that may be identified as being complementary to a particular item may not be selected to present to the user alongside the particular item.

FIG. 1 illustrates an example of a user interface 103 (e.g., 103a) associated with an electronic commerce system in accordance to various embodiments of the present disclosure. In particular, FIG. 1 illustrates a user interface 103 that includes primary user interface objects 104 (e.g., 104a, 104b) that display item listings 106 (e.g., 106a-106f) associated with previously purchased items that are organized in a horizontal layout according to item category. According to various embodiments, the display area for the item listings 106 that are in a given category can be referred to as an aisle and each aisle in FIG. 1 is associated with a primary user interface object 104. In the example of FIG. 1, there is an aisle for beverages and an aisle for produce.

The user interface 103 further includes a secondary user interface object 109 that provides item listings 106 (e.g., 106g-106l) for complementary items. In FIG. 1, the secondary user interface object 109 is presented below the primary user interface object 104 associated with the aisle for beverages and item listings 106 for the complementary items are arranged in a horizontal layout relative to the corresponding item listings 106 for the requested items 106. In particular, visual identifiers of the complementary items may be positioned in vertical alignment with of the corresponding requested item listings 106 such that it is clear to the user that the item listings 106 for complementary items are associated with a particular item listing 106 of a requested item.

It should be noted that although a secondary user interface object 109 for complementary items is presented below the primary user interface object 104 for beverages in FIG. 1, some aisles may include item listings 106 that are not associated with complementary items or are not associated with enough complementary items to warrant a display in a secondary user interface object 109. As such, according to various embodiments, some aisles may not be associated with a secondary user interface object 109 that includes a presentation of corresponding complementary items. For example, if the items selected for a particular aisle are not associated with a quantity of complementary items that is above a predefined threshold, a listing of complementary items for the given aisle of items may be excluded from presentation to the user.

According to various embodiments, as the user interacts with the user interface 103, the user interface 103 may be updated to provide additional information in response to the user interaction (e.g., hover action, component selection, mouse click, etc.) For example, in some embodiments, the user interface 103 may comprise scrolling component 112 that, upon selection, translates to a request to scroll the view associated with the primary user interface object 104 to view additional items listings 106, the secondary user interface object 109 associated with the complementary items may also be updated along with the related primary user interface object 104 (e.g., 104a) associated with the requested items. Accordingly, as additional items listings 106 for requested items are displayed in the primary user interface object 104, corresponding complementary items are displayed in the secondary user interface object 109.

According to various embodiments, when a user interacts with a particular item listing 106 for a complementary item, the secondary user interface object 109, including the complementary items, may be updated to include a selectable component 115 (FIG. 3B) for initiating a purchase of the item and/or other information regarding the complementary item. In some embodiments, a user interaction with the item listing 106 of the complementary item may trigger a request to redirect the user to an item detail page associated with the particular complementary item. In some embodiments, the request for the item detail page may occur during a second user interaction that follows modification to include a selectable component 115 following a first user interaction.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by avoiding the need to individually search an online catalog for complementary items; (2) improving the user experience in interacting with a computer system by automatically identifying complementary items, so the user is no longer required to search for a complementary item; (3) improving the functioning of the computing system through a more streamlined repurchase process that reduces user frustration when searching for other items; (4) improving the user experience in interacting with a computer system by providing a user interface that provides complementary items and options for purchasing the complementary items and/or providing additional information to the user regarding the item; and so forth. In the following discussion, a general description of the system and its components is provided, followed by a discussion of the operation of the same.

Figure 2:
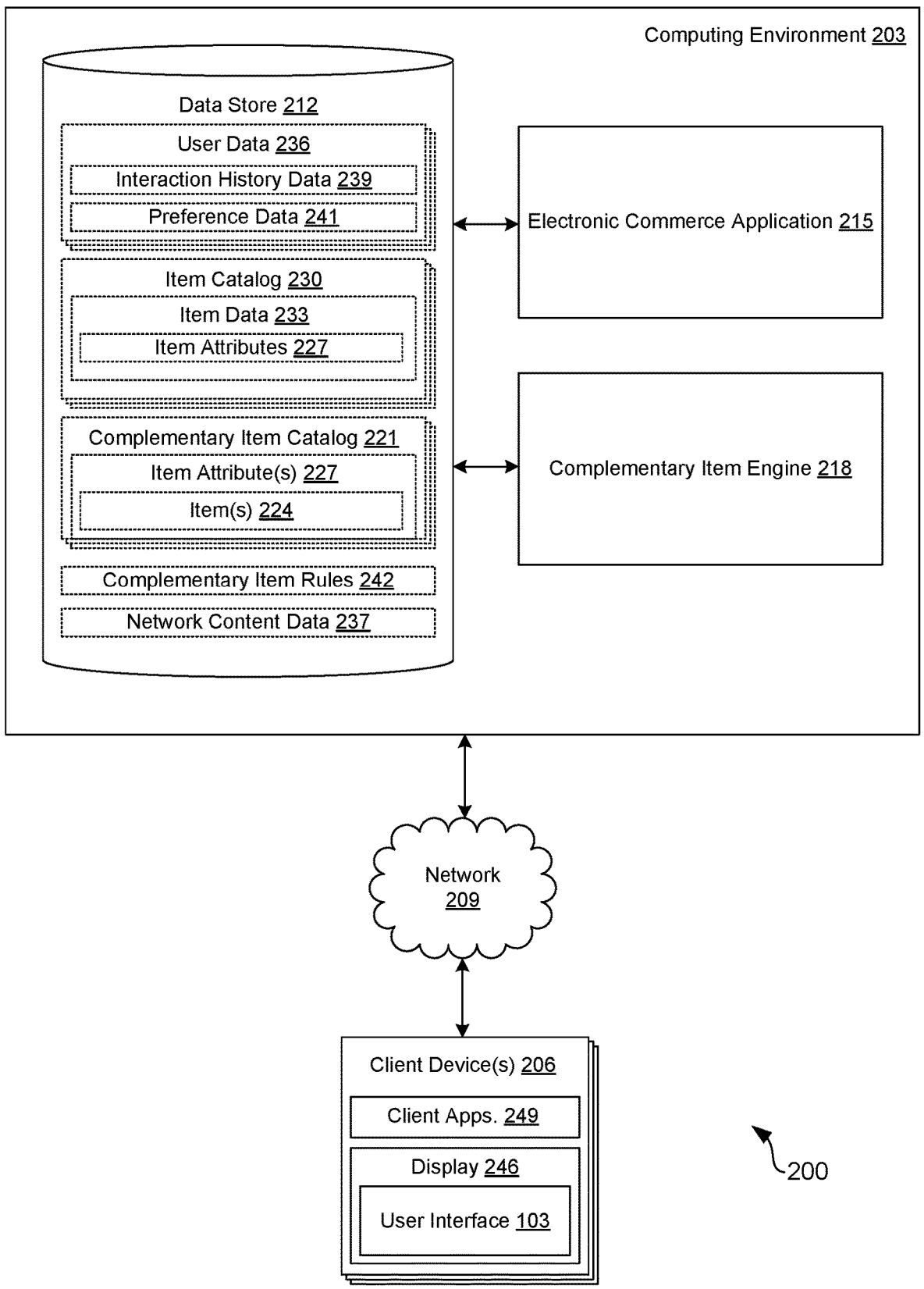
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client device(s) 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed in the computing environment 203, for example, include an electronic commerce application 215, a complementary item engine 218, and other applications, services, processes, systems, engines, or functionality not discussed in detail herein.

The electronic commerce application 215 is executed in order to facilitate the online sale, download, lease, rent, etc. of items from one or more electronic commerce systems over the network 209. Such items may include products, goods, services, digital content, and/or other items. The electronic commerce application 215 also performs various backend functions associated with the online presence of an electronic commerce system in order to facilitate the online purchase of items. For example, the electronic commerce application 215 generates network pages such as, for example, web pages and/or other types of network content that are provided to client devices 206 for the purposes of promoting and selecting items for purchase, rental, download, lease, or any other forms of consumption.

The complementary item engine 218 is executed to build the complementary item catalog 221 that includes items 224 that are available through an electronic commerce system and have been identified has being complements to one another according to item attributes 227 and/or other factors. For example, an item catalog 230 includes item data 233 regarding items 224 offered through the electronic commerce application 215. Such items 224 may include products, goods, services, digital content, and/or other items that can be offered for sale, lease, rent, download, etc. The complementary item engine 218 may analyze item attributes 227 to determine whether certain items 224 can be to be complements of one another. For example, the complementary item engine 218 can identify items 224 that share particular item attributes 227. In some examples, the complementary item engine 218 can assign a score to certain items 224 according to item attributes 227, an analysis of a recipe database, and/or other factors. The score may be based on predefined weights. The complementary item engine 218 may select items 224 from the item catalog 230 as being complements of one another if the respective score meets or exceeds a predefined threshold.

In some embodiments, the complementary item engine 218 may facilitate a verification process that allows a user (e.g., administrator, customer, etc.) to verify an identified item-to-item relationship. For example, the complementary item engine 218 may generate a user interface 103 that presents items 224 identified as being complements to one another according to a particular item attribute 227, known recipe, and/or other factor. A user can accept or decline any particular item from a list of complements to verify whether the items 224 should be considered complements to one another.

According to various embodiments, the complementary item engine 218 is further executed to identify and select complementary items to present to a user in response to a request for a list of items. For example, in response to a request for item listings 106 (FIG. 1), (e.g., past purchase, recommendations, wish list, etc.) via an interaction with the electronic commerce application 215, the complementary item engine 218 can compare each requested item 224 with the complementary item catalog 221 to determine if there are any identified complementary items that can be presented along with the requested items 224. If complementary items exist for a particular item 224, the complementary item engine 218 may analyze customer context (e.g., user data 236, interaction history data 239, preference data 241, etc.) and select a subset of the identified complementary items to present to the user.

In some embodiments, the complementary item engine 218 may assign a weight to each of the factors and generate a score for each identified complementary item for a particular item based in part on one or more factors. For example, the one or more factors may be based at least in part on the user data 236, such as, for example, interaction history data 239, user preference data 241, currently selected items for purchase, and/or other factors. To this end, the complementary item engine 218 may rank the identified complementary items based at least in part on the score and select at least one complementary item according to the ranking. In other embodiments, the complementary item engine 218 may determine if the score meets or exceeds a predefined threshold. For example, if a score fails to meet or exceed a predefined threshold, the complementary item engine 218 may determine to exclude the corresponding complementary item 224 from being presented with the given item 224.

The data stored in the data store 212 includes, for example, user data 236, an item catalog 230, a complementary item catalog 221, complementary item rules 242, network content data 237, and potentially other data. The user data 236 includes various data collected from or generated by users and/or customers having accounts in an electronic commerce site facilitated by the electronic commerce application 215. The user data 236 may include interaction history data 239, preference data 241, account address(es), payment instrument data, authentication information, and/or other data associated with a user or user account of the electronic commerce site.

The interaction history data 239 may include information specific to a user such as, for example, a purchase history (including purchase frequency, purchase cadence, purchase recency, etc.), a browsing history, a viewing history, a rating history, and/or other information that reflects a prior interaction of the user with the computing environment 203. The preference data 241 may include information related to preferences of items, item attributes, brands of items, quality of items, quantity of items, and/or other information.

The item catalog 230 includes item data 233 regarding items 224 offered through the electronic commerce application 215. Such items 224 may include products, goods, services, digital content, and/or other items that can be offered for sale, lease, rent, download, etc. The items 224 in the item catalog 230 may be organized according to a taxonomy of categories. For example, the items in the item catalog 230 may be categorized according to an item type with various item attributes 227 further defining a placement of an item in the taxonomy. For example, duck eggs and chicken eggs can include two branches of the taxonomy under a category for "eggs." Further, the category associated with chicken eggs, for example, may further include branches according to size, color, whether they are organic, and so on.

The item data 233 may include item attributes 227, an item identifier, descriptions, weights, prices, quantities available, export restrictions, customer reviews, customer ratings, images, videos, version information, availability information, shipping information, and/or other data. Item attributes 227 can include specific characteristics that define a given item. For example, item attributes 227 can include size, color, weight, packaging, quantity, freshness, ripeness, nutritional values, how the item is processed, brand, seasonality (e.g., fall, winter, spring, summer, holidays, etc.), associated activities (e.g., celebration, weddings, picnics, sporting events, etc.), associated meals (e.g., breakfast, lunch, dinner, snacks, etc.) and/or other attributes as can be appreciated.

The complementary item catalog 221 identifies items 224 that are determined to be complements of one another. In some embodiments, the complementary item catalog 221 can be in the form of a graph database or other type of database which is used to connect various items 224 to one another. For example, the items 224 may be connected to one another through item attributes 227 and/or other factors.

The complementary item rules 242 include rules, models, and/or configuration data for the various algorithms or approaches employed by the complementary item engine 218. For example, the complementary item rules 242 can include the various models and/or algorithms used by the complementary item engine 218 in building the complementary item catalog 221 and for identifying and selecting complementary items to a given requested item 224.

The network content data 237 may include various data employed in generating user interfaces 103 and/or other network pages. The network content data 237 may include hypertext markup language (HTML), extensible markup language (XML), cascading style sheets (CSS), images, text, audio, video, templates, and/or other data.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 246. The display 246 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 249 and/or other applications. The client application 249 may be executed in a client device 206, for example, to access network content served up by the computing environment 203 and/or other servers, thereby rendering a user interface 103 on the display 246. To this end, the client application 249 may comprise, for example, a browser, a dedicated application, etc., and the user interface 103 may comprise a network page, an application screen, etc. The client device 206 may be configured to execute applications beyond the client application 249 such as, for example, email applications, social networking applications, word processors, spreadsheets, and/or other applications.

Next, a general description of the operation of the various components of the networked environment 200 is provided. To begin, a user interacting with the electronic commerce application 215 may want to view items 224 of interest. As such, the user can request to view a listing of items 224 that may be of interest to the user (e.g., previously purchased items, items saved in a wish list, previously recommended items, etc.). In some examples, the electronic commerce application 215 may identify the list of items from the interaction history data 239. For example, for previously purchased items, the electronic commerce application 215 may identify the list of items based at least in part on the purchase history and the item identifiers associated with each previously purchased item. According to various embodiments, the electronic commerce application 215 may generate a user interface 103 including the listing of items arranged according to an item category, a frequency of purchase, a recency of purchase, a cadence of purchase, a recommendation, and/or other factors.

In some situations, an item 224 that may be included in the requested list of items may be associated with complementary items that a user may be interested in purchasing. For example, the complementary item engine 218 may analyze item attributes 227 of items 224 in an item catalog 230, a recipe database, and/or other data to identify items that can be considered complements of one another. For example, orange juice and champagne can be considered to be complements of one another as they are both associated with breakfast and mimosas. In another example, coffee and creamer can be associated with one another as they are both associated with breakfast and coffee. Similarly, milk and cookies can be identified as being complements of one another.

According to various embodiments, when the requested list of items is identified by the electronic commerce application 215, the complementary item engine 218 may determine if there are any complementary items for each item 224 in the requested list. In one example, the complementary item engine 218 may review the complementary item catalog 221 to determine if there are any complementary items for a given item 224. For example, if the item is orange juice, the complementary item engine 218 may identify the following items as complementary items to orange juice: champagne, pancake mix, biscuits, salad dressings, oil, and/or items.

According to various embodiments, the complementary item engine 218 may select a subset of complementary items to present to the user based at least in part on a customer context. In some embodiments, the complementary item engine 218 may analyze user data 236 to determine select complementary items that are likely to be of interest to the user. For example, the complementary item engine 218 can assign scores to a variety of factors for each item with respect to the user data 236. The factors can include, for example, item attributes, item brand, season, purchase history, and/or other factors as can be appreciated.

If the score exceeds a predefined threshold, the item 224 may be selected as a complementary item to present to the user. In some examples, if the number of items 224 that have scores that meet or exceed a predefined threshold meet or exceed a number of items 224 that may be presented to the user for a particular item, the complementary item engine 218 may rank the items based on the scores, and select a highest ranked number of items based on the number of complementary items that can be presented. In some embodiments, the complementary item engine 218 may determine that complementary items are to be displayed alongside one category (e.g., aisle) of item listings 106, but not another category of item listings 106.

Figure 3A:
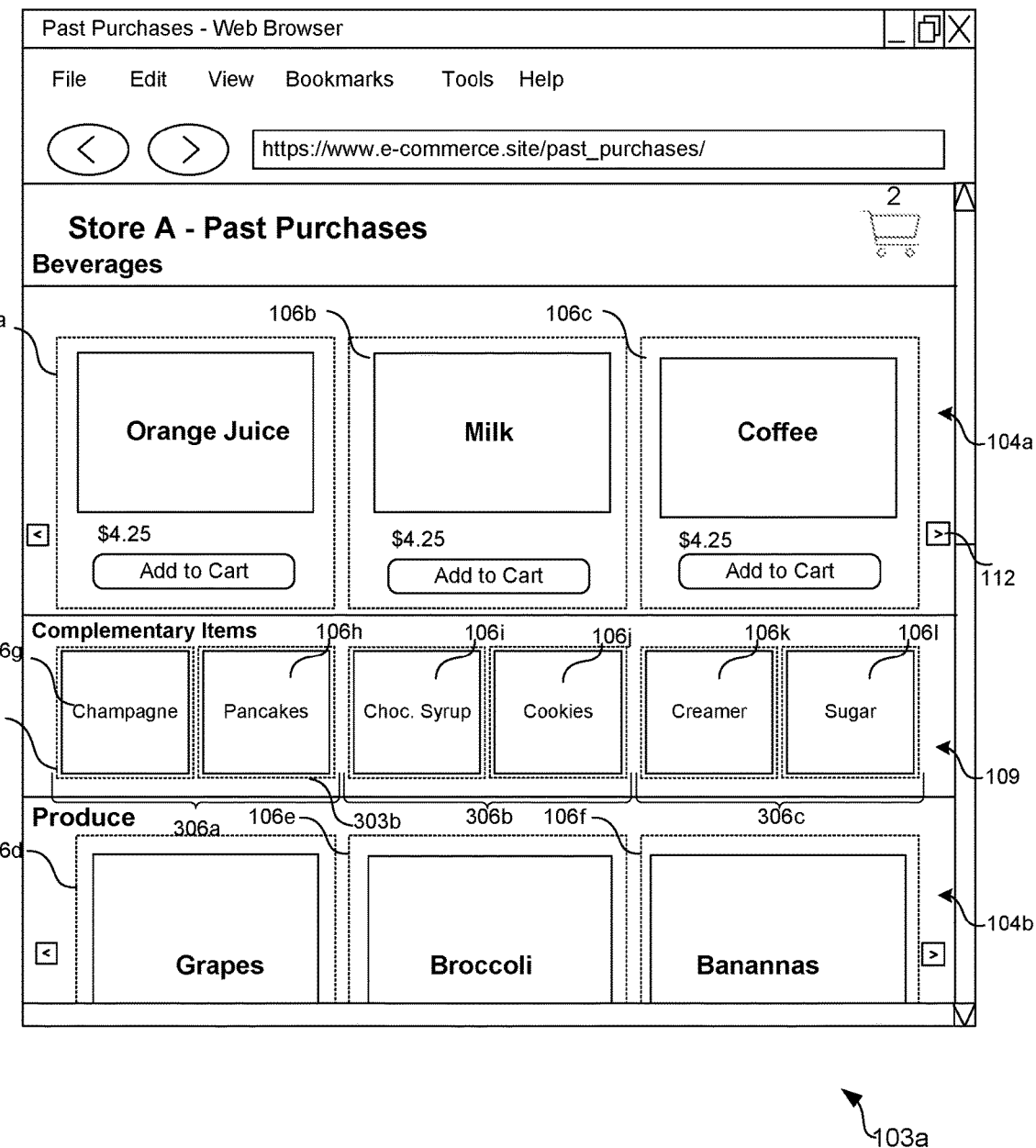
FIGS. 3A-3B are pictorial diagrams of example user interfaces rendered by a client device in the networked environment of FIG. 2 according to various embodiments of the present disclosure.
Figure 3B:
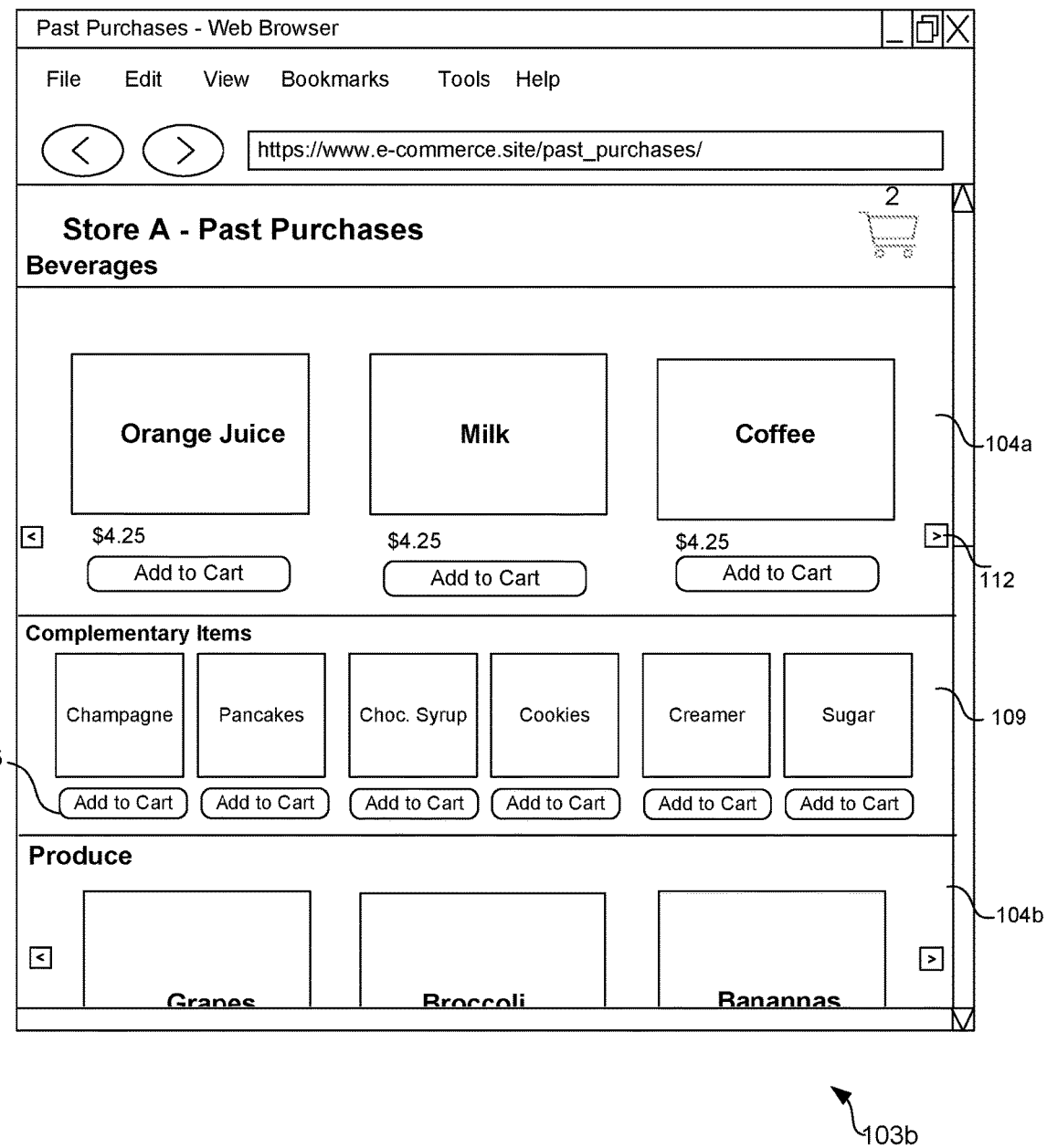

Upon identifying a list of complementary items, the electronic commerce application 215 can generate a user interface 103 that includes the requested list of items in a primary user interface object 104 (FIG. 1) and a list of complementary items in a secondary user interface object 109 (FIG. 1). For example, the electronic commerce application 215 may generate a user interface 103 that presents the requested list of items in aisles based on item category (e.g., beverages, produce, households, etc.), as shown in FIGS. 1, 3A and 3B. In this example, each item category is associated with a respective primary user interface object 104. According to various embodiments, the primary user interface object 104 and the secondary user interface object 109 can comprise panels, cards components or other type of inline expansion components, and/or other types of user interface elements as can be appreciated.

If there are complementary items to be displayed alongside items 224 in a given item category, the electronic commerce application 215 may generate a secondary user interface object 109 to be displayed in an area relative to the primary user interface object 104 (e.g., above, below, etc.) such that it is clear to the user which items 224 in the secondary user interface object 109 correspond to the item listings 106 in the primary user interface object 104. For example, the secondary user interface object 109 may be positioned below the primary user interface object 104, and the complementary item listings 106 in the secondary user interface object 109 may be visually aligned with (e.g., presented relative to) the item listings 106 of the primary user interface object 104 to allow a user to associate a requested item with the complementary items.

According to various embodiments, the electronic commerce application 215 generates the user interface 103 such that the primary user interface object 104 and the secondary user interface object 109 are dependent on one another. For example, a request to view additional item listings in the primary user interface object 104 (e.g., scroll to left or right to view additional items) may trigger a modification of the user interface 103 such that the additional item listings 106 are displayed while at least a portion of previously displayed item listings 106 are no longer visible to the user. When a display of the primary user interface object 104 is modified, the secondary user interface object 109 is also modified such that the complementary items to the additional requested item listings 106 are displayed in association with the additional requested item listings 106. For example, if the request to view additional items listings 106 in the primary user interface object 104 causes a horizontal scrolling movement to view additional item listings 106 in a particular aisle, the secondary user interface object 109 will be modified to mirror the movement of the primary user interface object 104.

The secondary user interface object 109 may be generated such that each complementary item listing 106 includes a respective secondary user interface element 303 (e.g., 303a, 303b) (FIG. 3A). User interaction (e.g., hovering, component selection, mouse click, etc.) with the area associated with a given secondary user interface element 303 can trigger an action which results in a modification of the user interface 103. For example, an interaction with the given secondary user interface element 303 may trigger a modification of a display of the secondary user interface object 109.

In some embodiments, the secondary user interface object 109 may be modified to expand to include selectable components 115 (FIG. 3B) associated with each complementary item listing 106. The selectable components 115 may be configured to, when selected, initiate a purchase of the complementary item 224 via the electronic commerce application 215. In some embodiments, an interaction with the secondary user interface element 303 can trigger a redirection to an item detail page associated with the particular item 224. In some examples, a first interaction with a secondary user interface element 303 may result in a visual modification of the secondary user interface object 109 to include the selectable components 115, and a second interaction with the secondary user interface element 303 can trigger a redirection to the item detail page for the given complementary item.

Referring next to FIGS. 3A and 3B, shown are example user interfaces 103 (e.g., 103a, 103b) including item listings 106 for requested items 224 (FIG. 2) along with complementary item listings 106 for items 224 that are determined to complement the requested items 224, according to various embodiments of the present disclosure. In particular, FIG. 3A illustrates the user interface 103a of FIG. 1 and FIG. 3B illustrates an example of a user interface 103b that may be displayed in response to a user interaction with a secondary user interface element 303 for a given complementary item 224.

In FIG. 3A, the user interface 103a includes a primary user interface object 104a that includes the requested item listings 106 (e.g., 106a, 106b, 106c) for a given item category (e.g., beverages). The user interface 103a further includes an additional primary user interface object 104b that includes requested item listings 106 (e.g., 106d, 106e, 106f) for another item category (e.g., product) displayed in a horizontal arrangement. In addition, the user interface 103a includes a secondary user interface object 109 (FIG. 1) that includes a list of complementary items that are presented in association with the item listings 106a, 106b, 106c displayed in the primary user interface object 104a. In particular, as shown in FIG. 3A, each requested item is associated with a set of complementary items 306 (e.g., 306a, 306b, 306c) such that the items listings 106 for the set of complementary items 306 are vertically aligned with the item listings 106 of the requested items 224 in the primary user interface object 104a to illustrate the connection between the requested item(s) 224 and the complementary item(s) 224.

According to various embodiments, each complementary item listing 106 includes a secondary user interface element 303 (e.g., 303a, 303b). User interaction (e.g., hover, mouse click, component selection, etc.) within an area defined by the secondary user interface element 303 may trigger an action associated with the particular item listing 106. For example, one action can include a modification of a visual display of the secondary user interface object 109 to expand to include a selectable component 115, as shown in FIG. 3B. Another action may redirect the user to an item detail page associated with the particular item.

It should be noted that FIGS. 3A-3B illustrate example user interfaces 103 associated with desktop or laptop device views. However, the user interfaces 103 can be generated for use on mobile devices, desktop devices, and/or laptop devices, respectively, and can be interchanged as can be appreciated. In some examples, user interfaces 103 may be adapted to accept user interactions for mobile view or desktop or laptop devices views as can be appreciated. For example, FIGS. 3A and 3B include a scrolling component 112 that, when selected, may trigger a scrolling action associated with the display views of the first user interface object 104 and the second user interface object 109. However, in some examples, a similar action can be triggered in response to a touch input or other type of user interaction with a display area of the user interface 103 that may not include a scrolling component 112.

Figure 4:
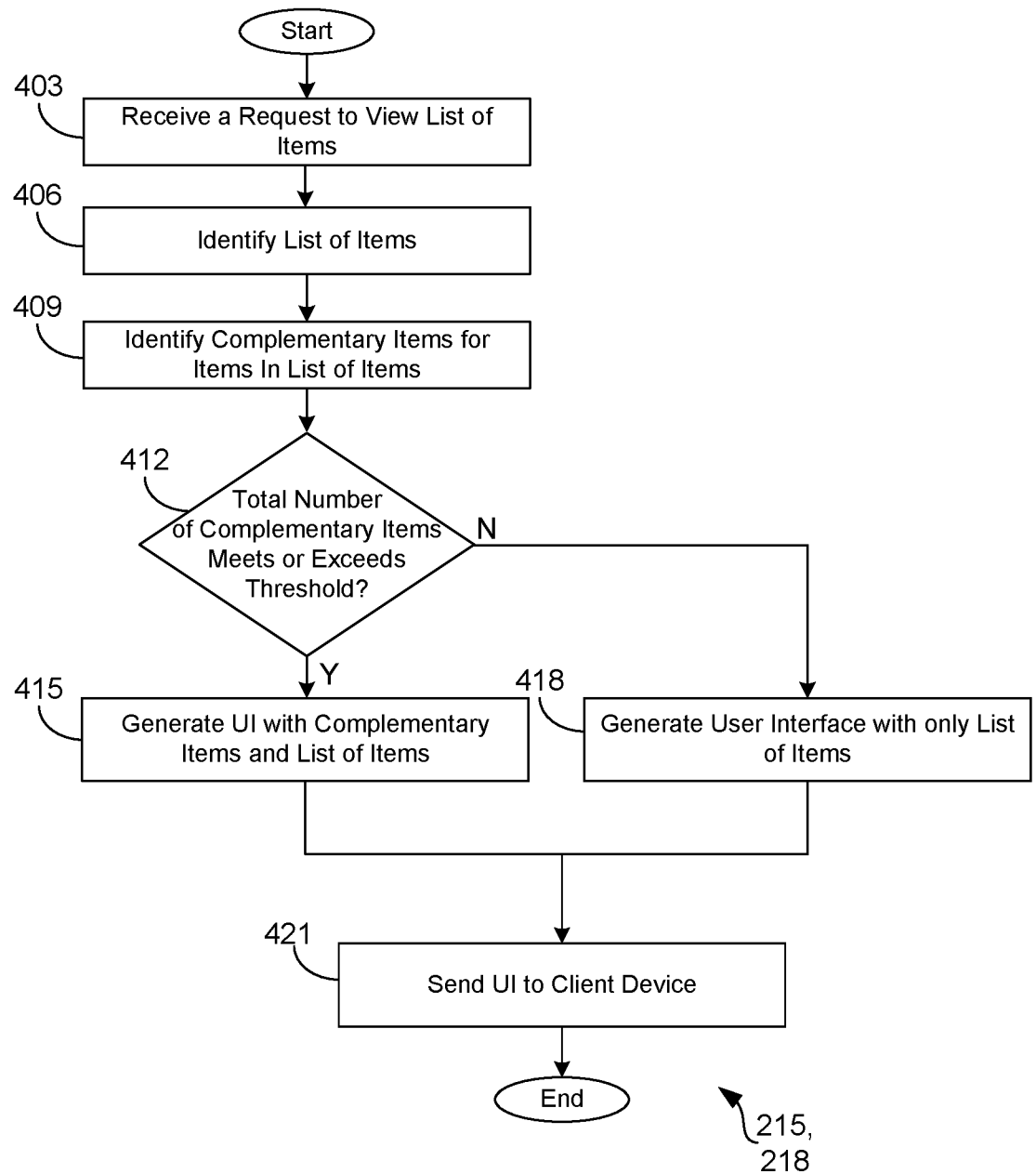
FIG. 4 is a flowchart illustrating one example of functionality implemented as portions of an electronic commerce application and a complementary item engine executed in a computing environment in the networked environment of FIG. 2 according to various embodiments of the present disclosure.

Referring next to FIG. 4, shown is a flowchart that provides one example of the operation of portions of the electronic commerce application 215, the complementary item engine 218, and/or other applications according to various embodiments. It is understood that the flowchart of FIG. 4 provides merely an example of the many different types of functional arrangements that may be employed to implement the operation of the portions of the electronic commerce application 215, the complementary item engine 218, and/or other applications as described herein. As an alternative, the flowchart of FIG. 4 may be viewed as depicting an example of elements of a method implemented in the computing environment 203 (FIG. 2) according to one or more embodiments.

Beginning with box 403, the electronic commerce application 215 receives a request to view a list of items. For example, a user interacting with a user interface 103 (FIG. 1) associated with the electronic commerce application 215 and rendered on a display 246 (FIG. 2) of a client device 206 (FIG. 2) may select a component that corresponds to a request to view items.

At box 406, the electronic commerce application 215 identifies the list of items 224 (FIG. 2) according to the request. The items may include previously purchased items, recommended items, best seller items, and/or other type of items as can be appreciated. For the purpose of this example, the list of items is a list of previously purchased items. In this example, the electronic commerce application 215 may analyze the interaction history data 239 (FIG. 2) to identify items 224 that have been previously purchased by the user.

At box 409, the complementary item engine 218 identifies complementary items for items included in the list of items. For example, the complementary item engine 218 may compare each requested item 224 with the complementary item catalog 221 (FIG. 2) to determine if there are any identified complementary items that can be presented along with the requested items 224. If a complementary item exists for a particular item 224, the complementary item engine 218 may analyze user context (e.g., user data 236 (FIG. 2), interaction history data 239, preference data 241 (FIG. 2), etc.) and select one or more of the identified complementary items to be associated with a given requested item.

In some embodiments, the complementary item engine 218 may assign a weight to each of the factors and generate a score for each identified complementary item for a particular item based in part, on one or more factors. For example, the one of more factors can be based at least in part on the user data 236, such as, for example, interaction history data 239, user preference data 241, currently selected items for purchase, and/or other factors. To this end, the complementary item engine 218 may rank the identified complementary items based at least in part on the score and select at least one complementary item according to the ranking. In other embodiments, the complementary item engine 218 may determine if the score meets or exceeds a predefined threshold. For example, if a score fails to meet or exceed a predefined threshold, the complementary item engine 218 may determine to exclude the corresponding complementary item 224 from being presented with the given item 224.

At box 412, the complementary item engine 218 or the electronic commerce application 215 determines if the number of complementary items identified for list of items meets or exceeds a predefined threshold. For example, assume that the predefined threshold corresponds to a number of item listings 106 for requested items 224 such that the threshold is four when there are four item listings 106. If the complementary item engine 218 only identifies two complementary items 224 for all of the requested items 224, the number of complementary items identified fails to meet or exceed the predefined threshold. However, if there are four complementary items identified, the number of complementary items 224 meets or exceeds the predefined threshold. If the number of complementary items identified meets or exceeds the predefined threshold, the process proceeds to box 415. Otherwise, the process proceeds to box 418.

At box 415, the electronic commerce application 215 generates a user interface 103 that includes a primary user interface object 104 (FIG. 1) that includes item listings 106 (FIG. 1) for requested items and a secondary user interface object 109 (FIG. 1) that includes item listings 106 for items identified as complementary to the requested items 224. At box 418, the electronic commerce application 215 generates a user interface 103 that only includes primary user interface object(s) 104 for item listings for requested items 224. Accordingly, if the number of identified complementary items 224 fails to meet or exceed a predefined threshold, the electronic commerce application 215 will not include a listing of complementary items 224.

At box 421, the electronic commerce application 215 transmits the user interface 103 to a client device 206. Thereafter, the process proceeds to completion.

Figure 5:
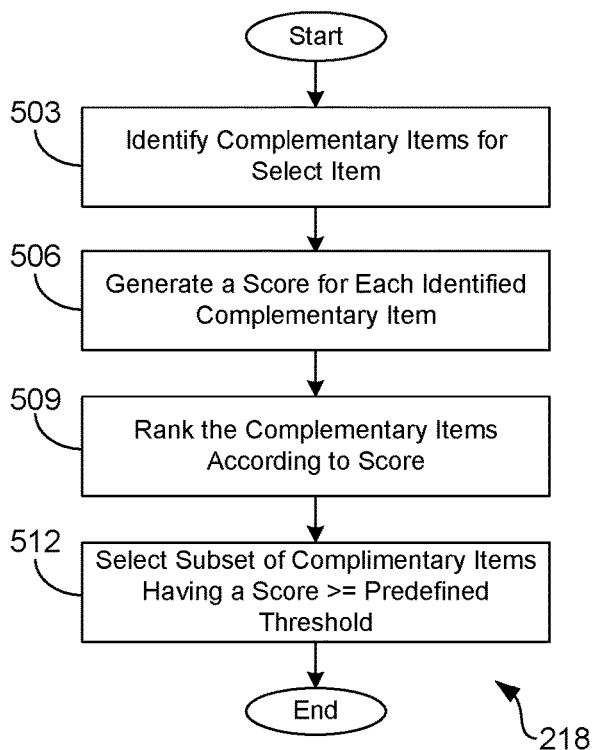
FIG. 5 is a flowchart illustrating one example of functionality implemented as portions of the complementary item engine executed in a computing environment in the networked environment of FIG. 2 according to various embodiments of the present disclosure.

Referring next to FIG. 5, shown is a flowchart that provides one example of the operation of portions of the complementary item engine 218, and/or other applications according to various embodiments. It is understood that the flowchart of FIG. 5 provides merely an example of the many different types of functional arrangements that may be employed to implement the operation of the portions of the complementary item engine 218, and/or other applications as described herein. As an alternative, the flowchart of FIG. 5 may be viewed as depicting an example of elements of a method implemented in the computing environment 203 (FIG. 2) according to one or more embodiments.

Beginning with box 503, the complementary item engine 218 identifies items that can be considered complementary to a select requested item. For example, the complementary item engine 218 may review the complementary item catalog 221 (FIG. 2) to determine if there are any complementary items for a given item 224 (FIG. 2). The complementary item catalog 221 can be built according to a comparison of attributes of items 224 in an item catalog 230 (FIG. 2) associated with the electronic commerce application 215 (FIG. 2), an analysis of a recipe database, and/or a review of other information that can be used to identify or otherwise link products as being complementary. In some embodiments, the complementary item engine 218 can identify the select requested item in the complementary item catalog 221 and determine which items have been associated with the select requested item 224 as being complementary.

At box 506, the complementary item engine 218 can generate a score for each identified complementary item based at least in part on user data 236 (FIG. 2) and item data 233 (FIG. 2). For example, the complementary item engine 218 may apply the complementary item rules 242 (FIG. 2) to analyze various factors associated with the item and the user context. The factors may include for example, item data 233 (e.g., item attributes 227 (FIG. 2), price, etc.), interaction history data 239 (FIG. 2), preference data 241 (FIG. 2), user location and/or region, and/or other factors. In some embodiments, the complementary item engine 218 can assign a weight to one or more of the factors. The sum of the weighted factors can be used as the score for each of the items.

At box 509, the complementary item engine 218 ranks the identified items according to the scores. At box 512, the complementary item engine 218 can select a subset of highest ranked items complementary items 224 to present to the user. In some examples, only those items with scores that meet or exceed a predefined threshold are selected. For example, if the top-ranked item has a score that fails to meet or exceed a predefined threshold, then no complementary items are selected for presentation to the user. Thereafter, this portion of the complementary item engine 218 ends.

Figure 6:
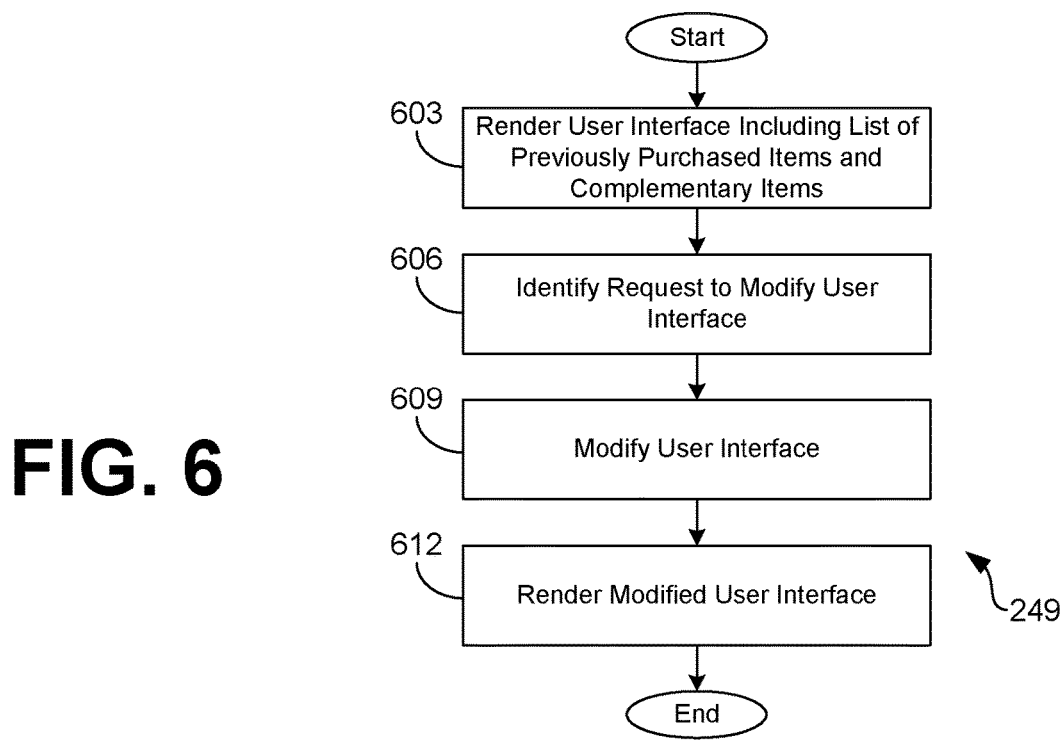
FIG. 6 is a flowchart illustrating one example of functionality implemented as a portion of a client application executed in a client device in the networked environment of FIG. 2 according to various embodiments of the present disclosure.

Referring next to FIG. 6, shown is a flowchart that provides one example of the operation of a portion of the client application 249 or other applications according to various embodiments. It is understood that the flowchart of FIG. 6 provides merely an example of the many different types of functional arrangements that may be employed to implement the operation of a portion of the client application 249 as described herein. As an alternative, the flowchart of FIG. 6 may be viewed as depicting an example of elements of a method implemented in the client device 206 (FIG. 2) according to one or more embodiments.

Beginning with box 603, the client application 249 renders a user interface 103 (FIG. 1) received from the electronic commerce application 215 (FIG. 2) that includes a list of items 224 (FIG. 2) displayed in a primary user interface object 104 (FIG. 1) and a list of complementary items displayed in a secondary user interface object 109 (FIG. 1).

At box 606, the client application 249 detects a request to modify the user interface view of the user interface 103. For example, the request may be translated from a user interaction with a secondary user interface element 303 (FIG. 3A), a user interface component 112 (FIG. 1), and/or other element in the user interface 103. The user interaction may correspond to a hover action, a mouse click, and/or other type of user interaction as can be appreciated.

In some examples, the client application 249 may detect a user interaction with respect to a secondary user interface element 303 for a particular complementary item 224. The user interaction can be detected in an area that defines the secondary user interface element 303 for a particular complementary item 224 and can correspond to a request for additional information for the complementary item 224. In another example, the client application 249 may detect a user interaction with a selectable component 115 (FIG. 3B) that may translate to a request to view additional item listings 106 (FIG. 1). In this example, interaction with the selectable component 112 can comprise a scrolling component which, selection of, may cause the user interface view to scroll horizontally to present the additional information.

At box 609, the client application 249 modifies the user interface 103 in response to the user interaction. For example, if the client application 249 detects a user interaction in an area defined by a particular secondary user interface element 303, the client application 249 can trigger a modification of the user interface 103 such that the display area of the secondary user interface object 109 is expanded to include selectable components 115 and/or additional information about the given complementary item 224. For example, selection of the selectable component 115 can initiate a purchase, lease, rent, download, etc. of the complementary item via the electronic commerce application 215. In some embodiments, the additional information may include item attributes (e.g., an item price) for the complementary item, a description of the complementary item, and/or other information associated with the item.

In another example, the client application 249 may detect a user interaction with a user interface component 112 in a primary user interface object 104, that interaction with, triggers a request to view additional item listings 106 associated with the primary user interface object 104. For example, the user interface component 112 may correspond to a request to modify the user interface view horizontally or vertically to view additional item listings. According to various embodiments, movement of the display of the primary user interface object 104 is mirrored by a corresponding secondary user interface object 109 that includes complementary items 224 such that as additional item listings 106 are presented in the primary user interface object 104, the item listings of the complementary items 224 are also updated in the secondary user interface object 109 to reflect the complementary items for the additional items 224.

In some embodiments, the user interface 103 comprises user interface code that can be executed by the client application 249 in response to a user interaction with the second user interface component 112. In other embodiments, the client application 249 notifies the electronic commerce application 215 of the interaction, and the electronic commerce application 215 generates and transmits a modified user interface 103 according to the user interaction.

At box 612, the client application 249 renders the modified user interface 103 and this portion of the client application 249 proceeds to completion.

Figure 7:
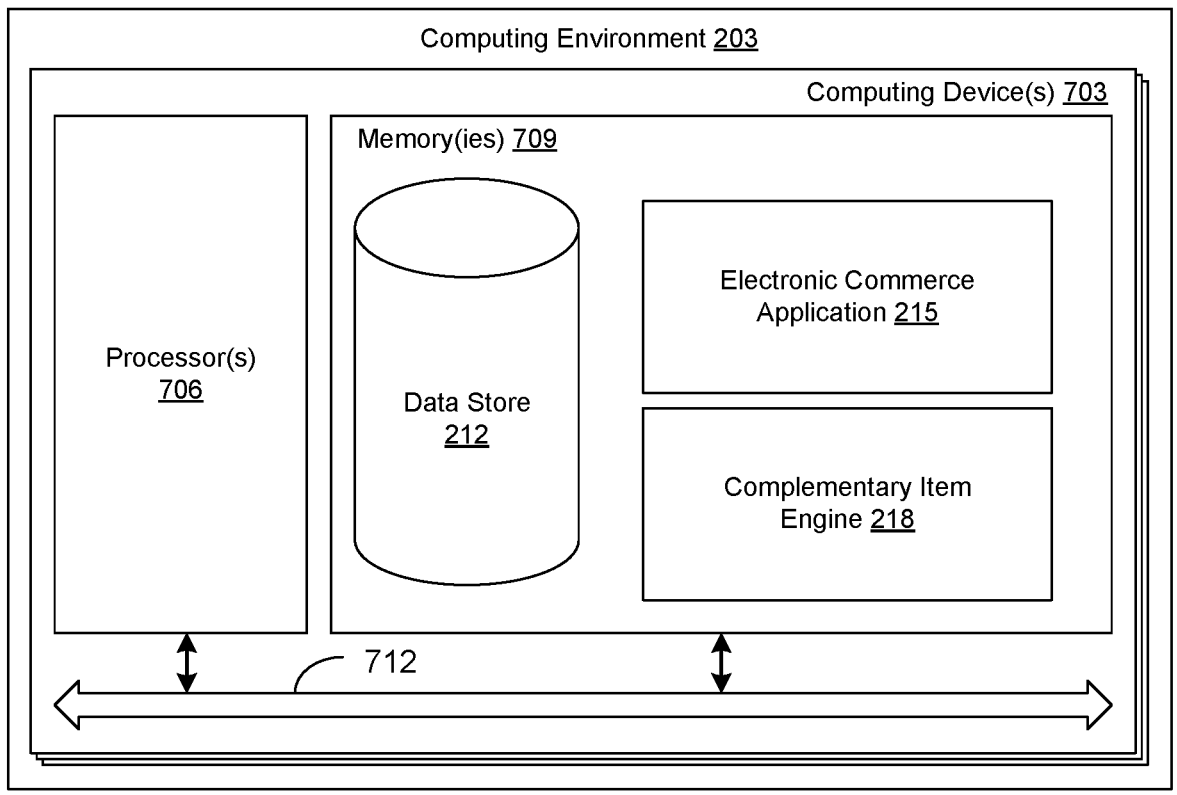
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 703. Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are an electronic commerce application 215, a complementary item engine 218, and potentially other applications. Also stored in the memory 709 may be a data store 212 and other data. In addition, an operating system may be stored in the memory 709 and executable by the processor 706.

It is understood that there may be other applications that are stored in the memory 709 and are executable by the processor 706 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 709 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706 may represent multiple processors 706 and/or multiple processor cores and the memory 709 may represent multiple memories 709 that operate in parallel processing circuits, respectively. In such a case, the local interface 712 may be an appropriate network that facilitates communication between any two of the multiple processors 706, between any processor 706 and any of the memories 709, or between any two of the memories 709, etc. The local interface 712 may comprise additional systems designed to coordinate this communication, including, for example, performing load balancing. The processor 706 may be of electrical or of some other available construction.

Although the electronic commerce application 215, the complementary item engine 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 6 show the functionality and operation of an implementation of portions of the electronic commerce application 215 and/or the complementary item engine 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 215 and the complementary item engine 218, that comprises software or code can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 215, and the complementary item engine 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices 703 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:

receive a request to view a plurality of previously purchased items associated with a user account;

for individual previously purchased items of the plurality of previously purchased items, identify at least one respective complementary item based at least in part on a complementary item catalog and a user context;

generate a user interface comprising a primary user interface object and a secondary user interface object, the primary user interface object comprising a plurality of item listings for the plurality of previously purchased items arranged in a horizontal layout, the secondary user interface object comprising the at least one respective complementary item for the individual previously purchased items, the at least one respective complementary item being positioned in vertical alignment with a corresponding previously purchased item, and the secondary user interface object being dependent upon the primary user interface object such that a modification of a first display of the primary user interface object results in a modification of a second display of the secondary user interface object;

generate a first update to the secondary user interface object to maintain the vertical alignment between the corresponding previously purchased item and the at least one respective complementary item as the corresponding previously purchased item is laterally moved by a scrolling component;

receive an indication of a user interaction with a particular item listing among the plurality of item listings in the primary user interface object; and generate a second update to the secondary user interface object to display a selectable component for the at least one respective complementary item associated with the particular item listing in response to the indication of the user interaction, wherein the secondary user interface object is expanded to include the selectable component, and the selectable component is configured to initiate adding the at least one respective complementary item to a shopping cart for a purchase.

2. The non-transitory computer-readable medium of claim 1, wherein when executed the program further causes the at least one computing device to at least build the complementary item catalog based at least in part on at least one of: a comparison of item attributes for a plurality of items available via an electronic commerce system or a plurality of recipes.

3. The non-transitory computer-readable medium of claim 2, wherein, when executed, the program further causes the at least one computing device to at least:

identify a plurality of related items for a particular previously purchased item of the plurality of previously purchased items according to the complementary item catalog; and select at least one related item from the plurality of related items based at least in part on the user context.

4. The non-transitory computer-readable medium of claim 1, wherein the user context comprises at least one of a user interaction history or a user preference data.

5. A system, comprising:

at least one computing device; and at least one application executable in the at least one computing device, wherein when executed the at least one application causes the at least one computing device to at least:

identify at least one complementary item for a requested item, the at least one complementary item being identified based at least in part on a shared item attribute;

generate a user interface comprising a first user interface object and a second user interface object, the first user interface object comprising the requested item and the second user interface object comprising the at least one complementary item positioned below and in vertical alignment with a position of the requested item in the first user interface object;

generate a first update to the second user interface object to maintain the vertical alignment between the requested item and the at least one complementary item as the requested item is laterally moved by a scrolling component;

receive an indication of a user interaction with the requested item in the first user interface object; and generate a second update to the second user interface object to display a selectable component for the at least one complementary item for the requested item in response to receiving the indication of the user interaction, wherein the second user interface object is expanded to include the selectable component, and the selectable component is configured to initiate a purchase of the at least one complementary item.

6. The system of claim 5, wherein, when executed, the at least one application further causes the at least one computing device to determine that a quantity of complementary items identified meets or exceeds a predefined threshold.

7. The system of claim 5, wherein the user interface comprises user interface code configured to modify a user interface view of the user interface in response to the user interaction.

8. The system of claim 5, wherein, when executed, the at least one application further causes the at least one computing device to at least receive a request to view a list of items available for purchase through an electronic commerce system, the requested item being in the list of items available for purchase.

9. The system of claim 8, wherein the list of items available for purchase comprises at least one of a list of previously purchased items, a list of recommended items, or a list of wish list items.

10. The system of claim 8, wherein, when executed, the at least one application further causes the at least one computing device to at least identify the list of items available for purchase based at least in part on a user interaction history.

11. The system of claim 10, wherein, when executed, the at least one application further causes the at least one computing device to at least organize the list of items available for purchase according to a plurality of items types, and wherein the first user interface object corresponds to a first item type.

12. The system of claim 5, wherein, when executed, the at least one application further causes the at least one computing device to at least:

identify a plurality of items in a complementary item catalog that are associated with the requested item based at least in part on the shared item attribute; and generate a score for individual items of the plurality of items based at least in part on at least one of a user interaction history or user preference data, the at least one complementary item having a score that meets or exceeds a predefined threshold.

13. The system of claim 12, wherein, when executed, the at least one application further causes the at least one computing device to at least:
rank the plurality of items based at least in part on the score; and
select a highest ranked subset of items from the plurality of items, the highest ranked subset of items being the at least one complementary item.

14. A method, comprising:
rendering, via a client device, a user interface comprising a first user interface object comprising a first requested item and a second user interface object comprising a first complementary item to the first requested item, the first complementary item being displayed relative to a display of the first requested item;
identifying, via the client device, a first user interaction with the first user interface object; and
modifying, via the client device, the user interface to update the first user interface object to display a second requested item and to update the second user interface object to display a second complementary item associated with the second requested item;
modifying, via the client device, the second user interface object to maintain a vertical alignment between the second requested item and the second complementary item as the second requested item is laterally moved by a scrolling component;
identifying, via the client device, a second user interaction with the second requested item in the first user interface object; and
modifying, via the client device, the second user interface object to display a selectable component for the second complementary item in response to the identification of the second user interaction, wherein a display area of the second user interface object is expanded to include the selectable component, and the selectable component is configured to initiate adding the second complementary item to a shopping cart for a purchase.

15. The method of claim 14, wherein the first user interface object comprises the scrolling component, and the first user interaction comprises a selection of the scrolling component, a hovering over a display area associated with the first user interface object, or a touch of the display area associated with the first user interface object.

16. The method of claim 14, further comprising identifying, via the client device, a third user interaction within the display area associated with the second complementary item.

17. The method of claim 14, further comprising initiating, via the client device, a purchase of the second complementary item in response to a selection of the selectable component.

18. The method of claim 16, further comprising rendering, via the client device, an item detail page associated with the second complementary item in response to the third user interaction.

19. The method of claim 14, wherein the second user interface object is displayed below the first user interface object such that the first complementary item is displayed in the vertical alignment with the display of the first requested item.

20. The method of claim 14, wherein the first user interaction is modifying a view of the first user interface object by removing the first requested item and adding the second requested item in the view of the first user interface object, wherein the view of the first user interface object is modified by the scrolling component.

* * * * *